UNITED STATES PATENT OFFICE.

HUGO WOLFF, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

PRODUCTION OF COLORING-MATTERS OF THE ANTHRAQUINONE SERIES.

1,133,081.  Specification of Letters Patent.  Patented Mar. 23, 1915.

No Drawing.  Application filed September 26, 1913. Serial No. 791,951.

*To all whom it may concern:*

Be it known that I, HUGO WOLFF, citizen of the German Empire, residing at Mannheim, Germany, have invented new and useful Improvements in the Production of Coloring-Matters of the Anthraquinone Series, of which the following is a specification.

I have found that by treating a 1-arylamino-anthraquinone containing a methyl group in the ortho position to the nitrogen atom with a halogenizing agent in the presence of a suitable solvent, such for instance as nitrobenzene or trichlorbenzene, anthraquinone-acridones can be obtained which, according to the method of carrying out the reaction, will contain more or less halogen. The methyl group in the ortho position to the nitrogen atom can be either in the aryl residue or in the anthraquinonyl residue. As instances of halogenating agents I mention chlorin, bromin and sulfuryl chlorid, without however restricting myself to these specific agents. The products yield intensely colored vats and dye vegetable fiber brilliant shades of excellent fastness.

The following examples will serve to illustrate further the nature of this invention, which, however, is not confined to these examples. The parts are by weight.

Example 1: Pass a current of chlorin into a solution containing 10 parts of 1-anilino-2-methyl-anthraquinone and a small quantity of iodin in 100 parts of nitrobenzene, while maintaining the temperature at about 160° C. When a test portion shows that no initial material remains unaltered, filter off the crystalline product, wash it with benzene, and dry it. The coloring matter, which contains chlorin, is obtained in the form of violet-brown leaflets which yield a red-yellow solution in concentrated sulfuric acid, while water precipitates the coloring matter in the form of violet-red flakes. With alkaline hydrosulfite a blue-violet vat is obtained which dyes cotton red with a violet tinge. The coloring matter yields a red solution in nitrobenzene and other organic solvents of high boiling point. A similar or identical product can also be obtained by treating 1-ortho-toluido-anthraquinone in a similar manner.

Example 2: Pass gaseous chlorin for several hours into 200 parts of trichlor-benzene containing 20 parts of 1-anilino-2-methyl-anthraquinone. If desired a reagent that will bind hydrochloric acid, such as calcined soda, and traces of water may be added to the reaction mixture. Maintain a temperature of from 150° to 170° C. When the mass is cold, filter off the product, wash it with benzene and dry it. A chloranthraquinone-acridone is obtained in the form of brown-red leaflets. It yields an orange-red solution in concentrated sulfuric acid and is precipitated from this solution by means of water, giving blue-red flakes. With alkaline hydrosulfite a violet-brown vat is obtained which dyes cotton very fast red shades with a blue tinge. The coloring matter yields a blue-red solution in nitrobenzene. The product obtained as above described is new and apparently consisting of a mixture of tetrachlor- and pentachlor-anthraquinone acridones. If, in this example, the 1-anilino-2-methyl-anthraquinone be replaced by 1-para-chlor-anilino-2-methyl-anthraquinone (obtainable, for instance, from para-chloranilin and 1-nitro-2-methyl-anthraquinone), a coloring matter is obtained which possesses similar properties. On subjecting 1-alpha-naphthylamino-2-methyl-anthraquinone to treatment with chlorin in the manner described above, a naphthanthraquinone-acridone is obtained in the form of a brown-red crystalline powder which yields a yellow-brown solution in concentrated sulfuric acid. It dissolves in nitrobenzene giving a blue-red solution and yields a violet-brown vat with alkaline hydrosulfite, from which vat cotton is dyed red-brown.

Example 3: Boil together gently, in a reflux apparatus, 50 parts of 1-anilino-2-methyl-anthraquinone, 500 parts of nitrobenzene and 120 parts of bromin, until a test portion shows that no unaltered initial material remains. Allow the mass to cool, then filter off the crystals and wash them with benzene. The brom-anthraquinone-acridone consists of a violet-brown crystalline powder which yields a blue-red solution in nitrobenzene and a red-brown solution in concentrated sulfuric acid. On pouring the sulfuric acid solution into water, violet-brown flakes are obtained which yield a violet vat from which cotton is dyed red with a violet tinge. Similar coloring matters can be obtained by employing trichlorbenzene as the solvent, and further the reaction can, if desired, be carried out at a lower temperature.

Example 4: Pass a current of chlorin, for a few hours, into 20 parts of 1-ortho-toluido-anthraquinone contained in 150 parts of trichlor-benzene, while maintaining the temperature at from 160° to 170° C. When the mass is cool, filter off the brown-red crystalline coloring matter which can be purified by extraction with boiling glacial acetic acid. It is similar to, or identical with the product obtainable according to the foregoing Example 2.

Example 5: Heat together for several hours, in a reflux apparatus, at from 170° to 175° C., 10 parts of 1-ortho-toluido-anthraquinone, 100 parts of nitrobenzene and 25 parts of bromin. When the mass is cool, filter off the coloring matter which is similar to, or identical with the brom-anthraquinone-acridone obtainable according to the foregoing Example 3.

Example 6: Dissolve 20 parts of 1-ortho-toluido-6-chlor-anthraquinone (obtainable by boiling 1-nitro-6-chlor-anthraquinone with ortho-toluidin) in 150 parts of nitro-benzene and, while maintaining a temperature of from 160° to 170° C., pass a current of chlorin into the solution until a test portion shows that no unaltered initial material is present. Allow the mass to cool and then filter off the coloring matter which is obtained in the form of small violet-red crystals. It dissolves in concentrated sulfuric acid yielding a red solution with a bluish tinge, and gives rise to a blue-violet vat which colors cotton violet shades which, upon washing and drying, becomes reddish violet.

Similar coloring matters can be obtained from the isomeric 1-ortho-toluido-5-chlor-anthraquinone and 1-ortho-toluido-7-chlor-anthraquinone.

Now what I claim is:—

1. The process of producing coloring matters of the anthraquinone series by treating, with a halogenizing agent in the presence of a suitable solvent, a 1-aryl-amino-anthraquinone containing a methyl group in the ortho position to the amino group.

2. The process of producing coloring matter of the anthraquinone series by treating 1-anilino-2-methyl-anthraquinone with chlorin at a raised temperature and in the presence of trichlorbenzene.

3. The new vat coloring matter which can be obtained by treating 1-anilino-2-methyl-anthraquinone with chlorin at a raised temperature and in the presence of trichlorbenzene, which new coloring matter is a chlor-anthraquinone-acridone and can be obtained in the form of brown-red leaflets, which yields an orange-red solution in concentrated sulfuric acid and is precipitated from this solution by means of water, giving blue-red flakes, which coloring matter yields a blue-red solution in nitrobenzene, and with alkaline hydrosulfite gives a violet-brown vat which dyes cotton very fast red shades with a blue tinge.

In testimony whereof I have hereunto set my hand in the presence of two subscribing witnesses.

HUGO WOLFF.

Witnesses:
J. ALEC. LLOYD,
JOSEPH PFEIFFER.